US008672005B2

(12) United States Patent
Nakano

(10) Patent No.: US 8,672,005 B2
(45) Date of Patent: Mar. 18, 2014

(54) PNEUMATIC TIRE WITH TREAD HAVING CONNECTING GROOVES

(75) Inventor: Keita Nakano, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 731 days.

(21) Appl. No.: 12/873,809

(22) Filed: Sep. 1, 2010

(65) Prior Publication Data

US 2011/0094642 A1  Apr. 28, 2011

(30) Foreign Application Priority Data

Oct. 28, 2009 (JP) .................................. 2009-248038

(51) Int. Cl.
*B60C 11/11* (2006.01)

(52) U.S. Cl.
USPC ....................................................... 152/209.8

(58) Field of Classification Search
USPC ............................................ 152/209.8, 209.9
See application file for complete search history.

(56) References Cited

U.S. PATENT DOCUMENTS

| 4,962,801 | A | * | 10/1990 | Tsuda ......................... 152/209.8 |
| 6,220,324 | B1 | * | 4/2001 | Oohigashi ................... 152/209.8 |
| D470,100 | S | * | 2/2003 | Johenning et al. .......... D12/563 |
| 6,607,018 | B1 | | 8/2003 | Fukunaga et al. |
| 6,823,912 | B2 | * | 11/2004 | Oohigashi ................... 152/209.8 |
| 2011/0094640 | A1 | * | 4/2011 | Nakano ..................... 152/209.18 |
| 2011/0094642 | A1 | * | 4/2011 | Nakano ..................... 152/209.23 |

FOREIGN PATENT DOCUMENTS

| DE | 19722572 A1 | 12/1998 |
| EP | 1992503 A1 | 11/2008 |
| JP | 2008-037260 A * | 2/2008 |

OTHER PUBLICATIONS

Machine translation for Japan 2008-037260 (no date).*
Extended European Search Report dated Feb. 8, 2011, for Application No. 10013855.1.

* cited by examiner

*Primary Examiner* — Steven D Maki
(74) *Attorney, Agent, or Firm* — Birch, Stewart, Kolasch & Birch, LLP

(57) ABSTRACT

A pneumatic tire comprises a tread portion having an outside tread edge and an inside tread edge. The tread portion is provided with: a plurality of oblique grooves extending from the outside tread edge toward the inside tread edge beyond the tire equator, while inclining to one circumferential direction corresponding to the tire rotational direction at angles of from 20 to 45 degrees with respect to said one circumferential direction; and a plurality of connecting grooves extending between the oblique grooves at angles β of from 90 to 180 degrees with respect to said one circumferential direction. Between every two of the adjacent oblique grooves, there are disposed are three or more of the connecting grooves which are gradually decreased in the angle β from the outside tread edge towards the inside tread edge, whereby a plurality of oblique blocks are formed between every two of the adjacent oblique grooves.

7 Claims, 10 Drawing Sheets

(Outside of vehicle)      (Inside of vehicle)

PNEUMATIC TIRE WITH TREAD HAVING CONNECTING GROOVES

BACKGROUND OF THE INVENTION

The present invention relates to a pneumatic tire, more particularly to a tread pattern capable of improving the lateral grip performance during running off the road.

Usually, off-road sport tires used in rally, dirt trial and the like are provided with block-type tread patterns in order to obtain superior road grip performance such as traction/braking performance and lateral grip performance.

In the European patent application publication No. EP1992503A1, a pneumatic tire is provided with an asymmetrical tread pattern in order to improve the traction performance and lateral grip performance, wherein the tread portion is provided with: a plurality of oblique grooves extending from the outside tread edge to the tire equator while inclining to the intended rotational direction, and a plurality of connecting grooves extending between the oblique grooves while inclining to the same direction as the oblique grooves.

By such groove arrangement, the traction performance and lateral grip performance are improved, but it was found that there is room for improvement in the lateral grip performance.

SUMMARY OF THE INVENTION

It is therefore, an object of the present invention to provide a pneumatic tire greatly improved in the lateral grip performance as well as the traction/braking performance.

According to the present invention, a pneumatic tire has a block-type tread pattern for which a tire rotational direction and a tire mounting position in relation to a vehicle are specified, and comprises a tread portion having a pair of tread edges which are an outside tread edge and an inside tread edge to be located on the outside and inside, respectively, of the vehicle to which the tire is attached, and the tread portion is provided with a plurality of oblique grooves extending from the outside tread edge toward the inside tread edge beyond the tire equator, while inclining to one circumferential direction corresponding to the tire rotational direction at angles of from 20 to 45 degrees with respect to said one circumferential direction, and a plurality of connecting grooves extending between the oblique grooves at angles β of from 90 to 180 degrees with respect to the above-mentioned one circumferential direction, wherein between every two of the adjacent oblique grooves, there are disposed three or more of the connecting grooves which are gradually decreased in the angle β from the outside tread edge towards the inside tread edge, whereby a plurality of oblique blocks are formed between every two of the adjacent oblique grooves.

During cornering, the tire positioned on the outside of turning is increased in the ground pressure in the outside part of the tread portion, and the oblique grooves formed in such outside part of the tread portion, become substantially perpendicular to the direction of side skid of the tire. Accordingly, the oblique grooves can effectively resist against the side skid, and the lateral grip performance can be improved. The connecting grooves having relatively small angles β can improve the traction/braking performance during straight running. The connecting grooves having relatively large angles β can improve the lateral grip performance from the initial stage to the middle stage of cornering.

Therefore, the lateral grip performance can be effectively improved together with the traction/braking performance.

Here, the tread edges are the axial outermost edges of the ground contacting patch (camber angle=0) in a normally inflated loaded condition.

The normally inflated loaded condition is such that the tire is mounted on a standard wheel rim and inflate to a standard pressure and loaded with a standard tire load.

The undermentioned tread width is the axial distance between the tread edges measured in a normally inflated unloaded condition of the tire.

The normally inflated unloaded condition is such that the tire is mounted on the standard wheel rim and inflate to the standard pressure but loaded with no tire load.

The standard wheel rim is a wheel rim officially approved for the tire by standard organization, i.e. JATMA (Japan and Asia), T&RA (North America), ETRTO (Europe), STRO (Scandinavia) and the like.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of the tire refer to those under the normally inflated unloaded condition of the tire unless otherwise noted.

DESCRIPTION OF THE PREFERRED EMBODIMENTS

Embodiments of the present invention will now be described in detail in conjunction with the accompanying drawings.

Figure 1:
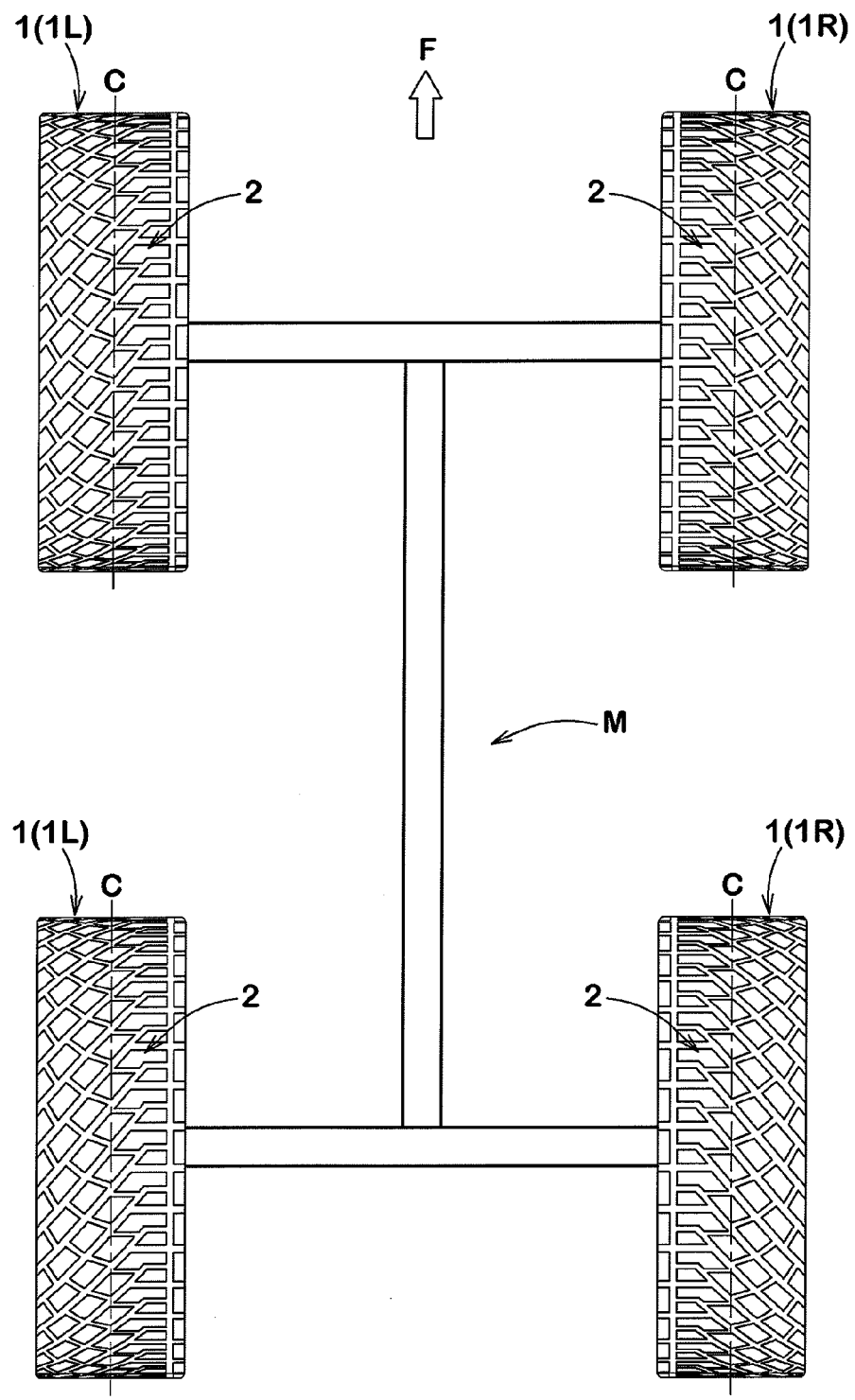
FIG. 1 shows an arrangement of pneumatic tires according to the present invention designed for a four-wheeled vehicle when viewed from above the vehicle.

According to the present invention, pneumatic tire 1 comprises a tread portion 2, a pair of sidewall portions, a pair of axially spaced bead portions, a carcass extending between the bead portions, and a tread reinforcing cord slayer disposed radially outside the carcass in the tread portion as usual. But, the tire mounting position (namely, right side or left side of the vehicle) and the tire rotational direction are specified. Therefore, as shown in FIG. 1, pneumatic tire 1 according to the present invention includes a left-hand tire 1L and a right-hand tire 1R for use on the left side and the right side of a vehicle M, respectively. Reference sign "F" denotes the travelling direction (Forward).

The left-hand tire 1L and right-hand tire 1R have respective tread patters which are unidirectional tread patters for which a tire rotational direction is specified. The intended tire mounting position (left side or right side) and tire rotational direction R are indicated in the tire sidewall portion (not shown) by the use of characters and/or marks.

The tread portion 2 has an inside tread part 2i defined between the tire equator C and the inside tread edge Ti to be located inward of the vehicle, and an outside tread part 2o defined between the tire equator C and the outside tread edge To to be located outward of the vehicle.

In this embodiment, the tires 1L and 1R are designed for a four-wheeled vehicle M for running on rough terrains which is provided with negative camber, namely, in the front view of the vehicle, the wheels (especially front wheels) are inclined toward the inside of the vehicle.

In the case of the vehicle M having negative camber, during straight running, the ground pressure of the inside tread part 2i becomes increased in comparison with the outside tread part 2o.

The tread portion 2 in this embodiment is provided with: an inside circumferential groove 3 extending circumferentially of the tire near the tread edge Ti;

a plurality of oblique grooves 6 each extending from the outside tread edge To towards the inside tread edge Ti beyond the tire equator C, while inclining to the tire rotational direction R;

a plurality of 1st axial grooves 4 each extending in the tire axial direction from the inside end of one of the oblique grooves 6 to the inside circumferential groove 3:

a plurality of 2nd axial grooves 5 each extending in the tire axial direction from one of the oblique grooves 6 to the inside circumferential groove 3 so that the 2nd axial grooves 5 and 1st axial grooves 4 alternate in the tire circumferential direction; and a plurality of connecting grooves 7 extending between the oblique grooves 6.

Thereby, the tread portion 2 is provided with a plurality of blocks B defining a block pattern which is asymmetrical about the tire equator C and is different between the inside tread part 2i and outside tread part 2o.

As to the groove widths w1, w2, w3, w4 and w5 of the grooves 3, 4, 5, 6 and 7, if they are too narrow, it is difficult to provide good traction on muddy roads and sandy roads. If they are too wide, on the other hand, the land ratio decreases, and it is difficult to provide good traction/braking performance on gravel roads and hard earthen roads.
Therefore, the groove widths w1, w2, w3, w4 and w5 are preferably set in a range of not less than 6.0 mm, more preferably not less than 8.0 mm, but not more than 15.0 mm, more preferably not more than 12.0 mm.
For the similar reasons, the groove depths of the grooves 3, 4, 5, 6 and 7 are preferably set in a range of not less than 8.0 mm, but not more than 15.0 mm.

The inside circumferential groove 3 in this example is a straight groove. The distance X of the inside groove edge 3e of the inside circumferential groove 3 from the inside tread edge Ti is set in a range of from 0.05 to 0.10 times the tread width TW between the tread edges Ti and To.

Therefore, by the straight edges of the inside circumferential groove 3, lateral grip performance during cornering can be effectively improved.

In order to maintain high block rigidity and to prevent uneven wear and tearing-off of the blocks, aside from the inside circumferential groove 3, there is no other circumferential groove extending straight or substantially straight in the tire circumferential direction.

During cornering, the tire on the outside of turning is increased in the ground pressure in the outside tread part 2o than the inside tread part 2i, but the tire on the inside of turning is increased in the ground pressure in the inside tread part 2i than the outside tread part 2o. Therefore, if a circumferential groove is disposed in the outside tread part 2o, especially, near the outside tread edge To, then the car is liable to overturn during high speed cornering because the tire on the outside of turning is strongly resist to side-skid. By disposing the inside circumferential groove 3 near the inside tread edge Ti, the tire on the inside of turning can resist against side-skid. But, the overturning of the car is prevented because the tire on the inside of turning is subjected to a drag force. Therefore, in this embodiment, the inside circumferential groove 3 is the only one circumferential groove. There is no groove which extends in a substantially straight or slightly zigzagged configuration.

The tread portion 2 in this embodiment is provided with inside axial grooves 8 arranged at regular intervals in the tire circumferential direction.

Each of the inside axial grooves 8 extends in the tire axial direction from the inside circumferential groove 3 beyond the inside tread edge Ti. Therefore, by the edges of the inside axial grooves 8, the traction/braking performance during straight running can be increased.

The groove width w6 and depth of the inside axial grooves 8 are set in the same ranges as those for the grooves 3, 4, 5, 6 and 7.

The 1st axial grooves 4 each have
an inside end connected to the inside circumferential groove 3 at a circumferential position corresponding to a position between the inside axial grooves 8, and
an outside end connected to the inside end of one of the oblique grooves 6.

The 1st axial grooves 4 extend in the tire axial direction, preferably parallel with the tire axial direction. Therefore, by the edges of the 1st axial grooves 4, the traction/braking performance during straight running can be improved.

The 2nd axial grooves 5 each have an inside end connected to the inside circumferential groove 3, and an outside end connected to one of the oblique grooves 6 at an axial position on the inside tread edge Ti side of the tire equator C and on the outside tread edge To side of the inside end of the oblique groove 6. The 2nd axial groove 5 is accordingly longer than the 1st axial groove 4.

The 2nd axial grooves 5 extend in the tire axial direction, preferably parallel with the tire axial direction. Therefore, by the edges of the 2nd axial grooves 5, the traction/braking performance during straight running can be improved.

The 2nd axial grooves 5 are substantially aligned with the inside axial grooves 8. Thus, the 2nd axial grooves 5 are coupled with the inside axial grooves 8, respectively, through the inside circumferential groove 3.

The oblique grooves 6 each have an outside end opened at the outside tread edge To, and the inside end on the inside tread edge Ti side of the tire equator C. Thus, the oblique grooves 6 extend across the entire width of the outside tread part 2o and a part of the width of the inside tread part 2i. Towards the inside tread edge Ti from the outside tread edge To, the oblique grooves 6 are inclined to the tire rotational direction R at an angle α of from 20 to 45 degrees, preferably 30 to 45 degrees with respect to the tire circumferential direction.

By limiting the angle α in this way, as the tire is rotated, the earth and sand, and pebble in the oblique grooves 6 can be ejected sideways, which facilitates the improvement in the traction/braking performance.

Each of the oblique grooves 6 in this embodiment is a straight groove. But, a slightly curved groove, for example, single arc, multi-arc, or wavy configuration may be employed.

In order to derive the above-mentioned function effectively, it is desirable that the oblique grooves 6 are extended to near the inside tread edge Ti.

Figure 4:
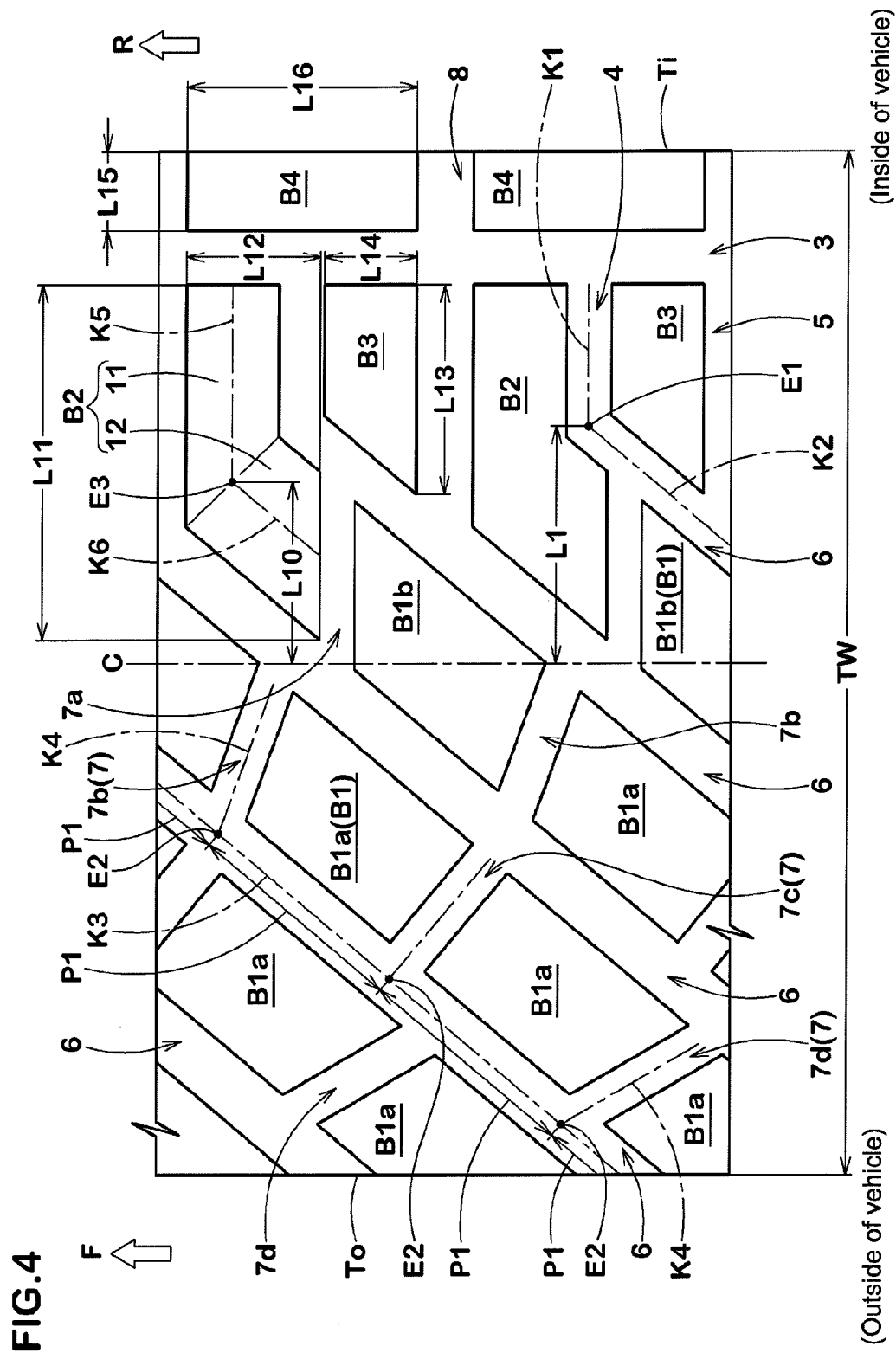
FIG. 4 is an enlarged view of the tread portion shown in FIG. 2.

For example, as shown in FIG. 4, the axial distance L1 from the tire equator C to the junction point between the oblique groove 6 and 1st axial groove 4, more definitely, to the intersection point E1 between the groove widthwise center line K2 of the oblique groove 6 and the groove widthwise center line K1 of the 1st axial groove 4, is set to be more than 0 time, preferably not less than 0.2 times the tread width TW.

However, if the distance L1 becomes too large, as the 1st axial grooves 4 become shorter, and the traction/braking performance during straight running tends to deteriorates. Therefore, the distance L1 is preferably not more than 0.35 times, more preferably not more than 0.3 times the tread width TW.

Figure 2:
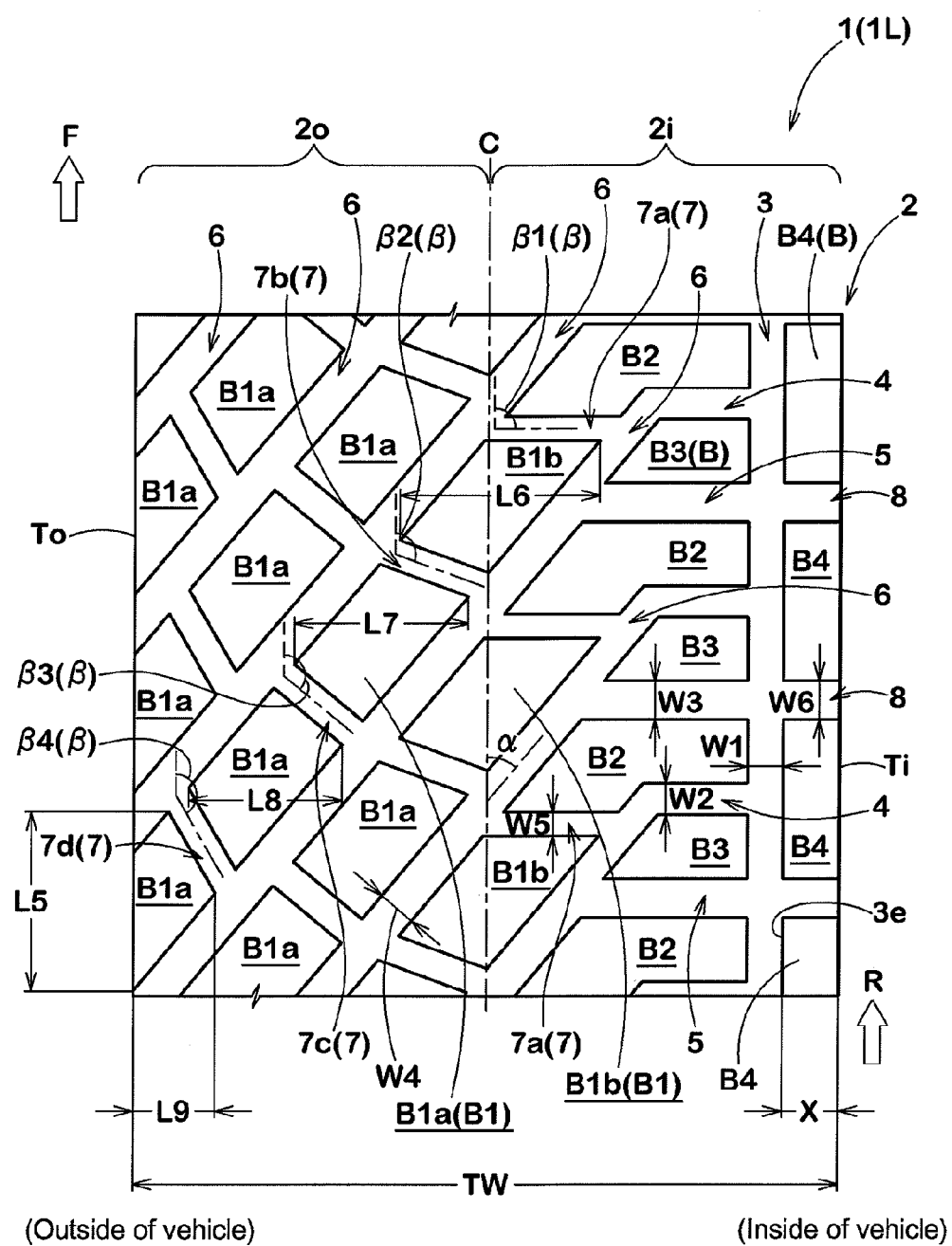
FIG. 2 is a developed partial top plan view of the left-hand pneumatic tire showing the tread portion.

The connecting grooves 7 are as shown in FIG. 2 arranged such that at least three of them (in this example four of them) are disposed between every two of the adjacent oblique grooves 6. More specifically, in this example, a 1st connecting groove 7a, a 2nd connecting groove 7b, a 3rd connecting groove 7c and a 4th connecting groove 7d are disposed between the two oblique grooves 6 in this order from the inside tread edge side to the outside tread edge side.

The connecting grooves 7 are substantially straight grooves inclined at angles β in a range of from 90 to 180 degrees with respect to the circumferential direction, namely, as shown in FIG. 2, basically inclined to opposite directions to that of the oblique grooves 6. More specifically, excepting the connecting grooves 7 having the angle β of 90 degrees, most of the connecting grooves 7 are inclined to opposite directions to that of the oblique grooves 6.

The angle β is as shown in FIG. 2, defined at the end of the connecting groove 7 on the outside tread edge To side as the angle between the widthwise center line of the connecting groove 7 and a line parallel to the tire circumferential direction drawn towards the tire rotational direction from the above-mentioned end.

The connecting grooves 7 between every two of the adjacent oblique grooves 6 are gradually decreased in the angle β from the outside tread edge side to the inside tread edge side. Namely, the angles β1, β2, β3, β4—of the 1st, 2nd, 3rd, 4th—connecting grooves 7a, 7b, 7c, 7d—satisfy a condition (1): β1<β2<β3<β4—.

Figure 5:
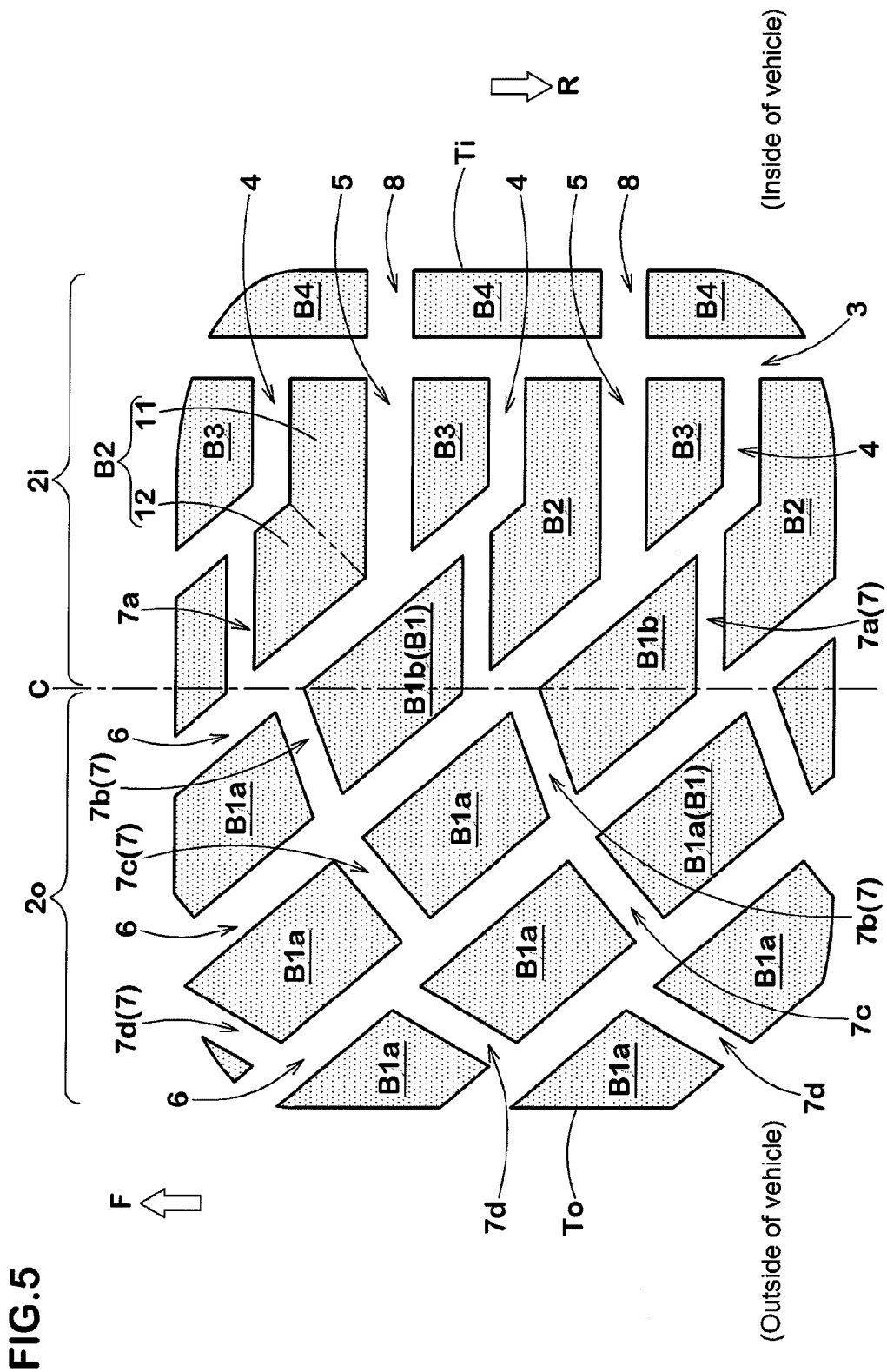
FIG. 5 is a foot print of the left-hand pneumatic tire during straight running.

In the example shown in FIG. 2, during straight running, the ground pressure is relatively increased in the positions in which the 1st and 2nd connecting grooves 7a and 7b are formed. And as shown in FIG. 5, the edges of the 1st and 2nd connecting grooves 7a and 7b are becomes almost perpendicular to the traveling direction F, and increase the traction/braking performance.

Figure 6:
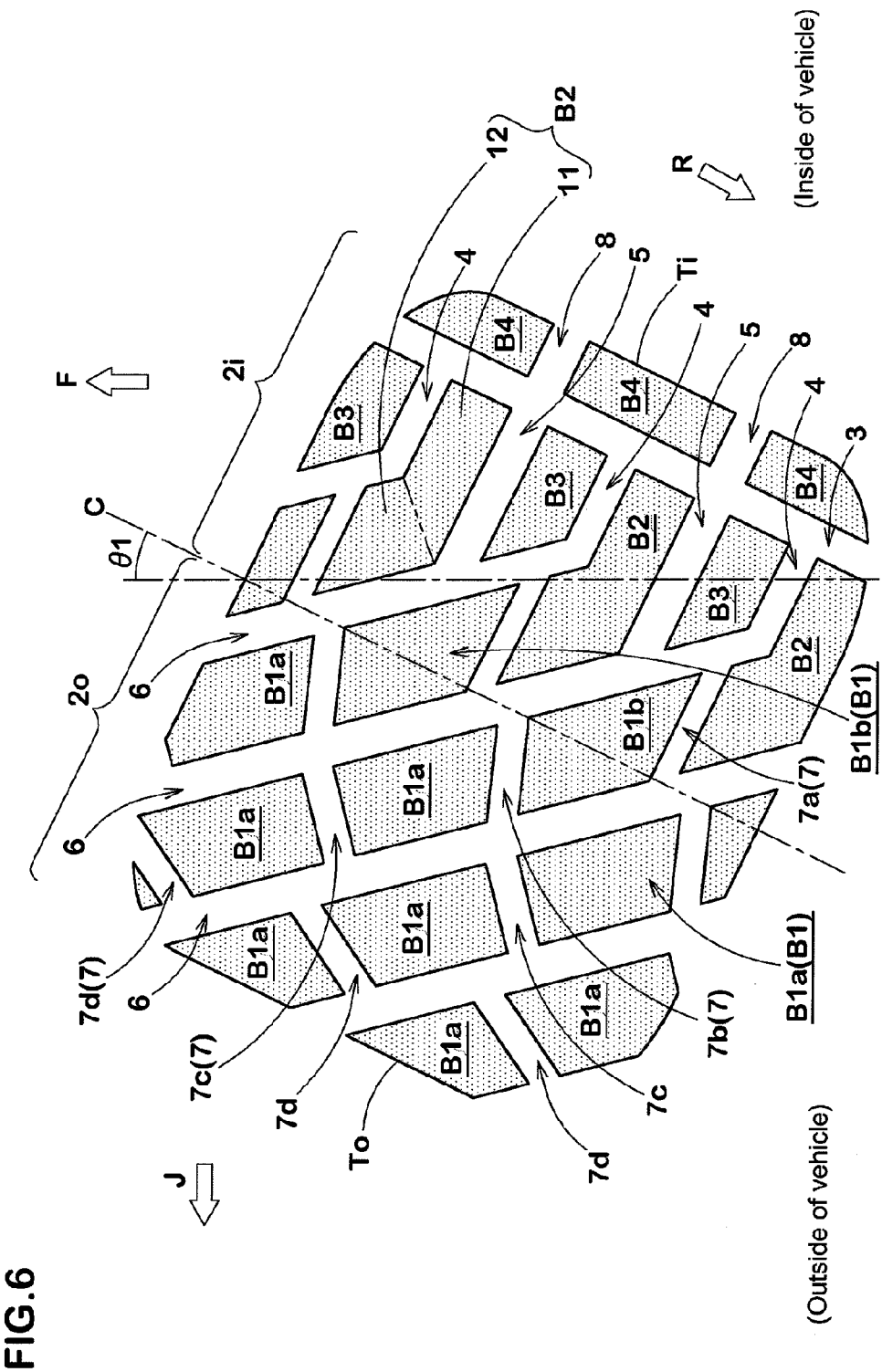
FIG. 6 is a foot print the left-hand pneumatic tire during cornering.

During cornering, the outside tread part 20 of the tread portion 2 of the tire positioned on the outside of turning is relatively increased in the ground pressure, and the edges of the 3rd and 4th connecting grooves 7c and 7d disposed in such outside tread part 2o are as shown in FIG. 6, becomes almost perpendicular to the direction J of side-skid of the vehicle, and increase the lateral grip performance.

In particular, by satisfying the above-mentioned condition (1), the characteristic change from the initial stage to the middle stage of cornering becomes smooth and corresponding to the steering operation. Thus, the steering stability can be improved.

The angle β1 of the most-inside 1st connecting groove 7a is preferably set in a range of from 90 to 100 degrees, most preferably 90 degrees in order to maximally derive the traction/braking performance during straight running.

Preferably, the angle difference between the adjacent angles βi−β(i−1) (i is an integral number, i>1), is set in a range of not less than 10 degrees, more preferably not less than 15 degrees, but not more than 30 degrees, more preferably not more than 25 degrees.

If the difference is less than 10 degrees, as the angles β of the oblique grooves 6 as a whole become small, it is difficult to derive the traction/braking performance and/or lateral grip performance effectively. If the difference is more than 30 degrees, the variation of block rigidity increases, and there is a possibility that the steering response and behavioral stability in a transient state from straight running to cornering are deteriorated.

Incidentally, the angle differences can be either constant or variable.

Preferably, the ratio (βmin/βmax) of the minimum βmin to the maximum βmax of the angles β is set in a range of not less than 0.5, more preferably not less than 0.6, but less than 1.0, more preferably not more than 0.9.

In this example, the minimum βmin is β1, the maximum βmax is β4 and the ratio (βmin/βmax) is β1/β4.

If the ratio is less than 0.5, the friction with the ground is abruptly changed between the initial stage and middle stage of cornering.

The arrangement pitches P1 (shown in FIG. 4) of the connecting grooves 7a, 7b, 7c and 7d are constant.

As described above, the connecting grooves 7a, 7b, 7c and 7d extends between the two adjacent oblique grooves 6, namely, that on the rotational direction R side and that on the counter side. The arrangement pitches P1 are defined by distances between the intersection points E2 of the widthwise center lines K4 of the connecting grooves 7 with the widthwise center line K3 of the oblique groove 6 on the rotational direction R side.

Between every two adjacent oblique grooves 6, there are formed a plurality of oblique blocks B1 separated by the connecting grooves 7.

The oblique blocks B1 include
a plurality of outside oblique blocks B1a each having a ground contacting top surface whose centroid is located on the outside tread edge To side of the tire equator C, and
an inside oblique blocks B1b having a ground contacting top surface whose centroid is located on the inside tread edge Ti side of the tire equator C, and intersected by the tire equator C.

Figure 3:
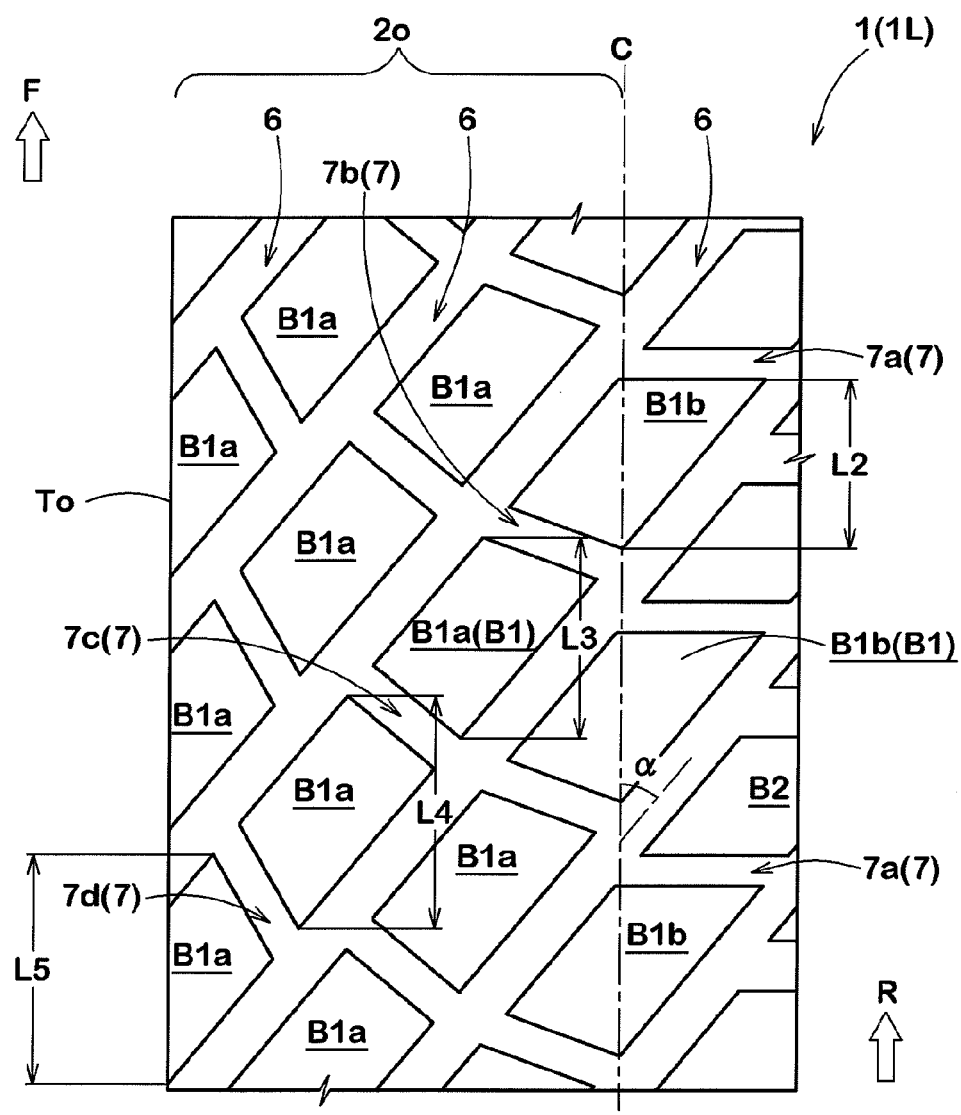
FIG. 3 is an enlarged view of the outside tread part of the tread portion shown in FIG. 2.

Preferably, the oblique blocks B1 have circumferential lengths (L2, L3, L4 and L5 shown in FIG. 3) which are increased from the inside tread edge Ti side to the outside tread edge To side. Therefore, the circumferential component of the edges of the block becomes longer as the oblique block is positioned more outside where the ground pressure is larger. As a result, the lateral grip performance can be effectively improved.

In order to derive the above function effectively, the ratio (L2/L5) of the minimum circumferential length (L2) to the maximum circumferential length (L5) is preferably set in a range of not less than 0.4, more preferably not less than 0.5, but not more than 1.0, more preferably not more than 0.9.

Figure 7A:
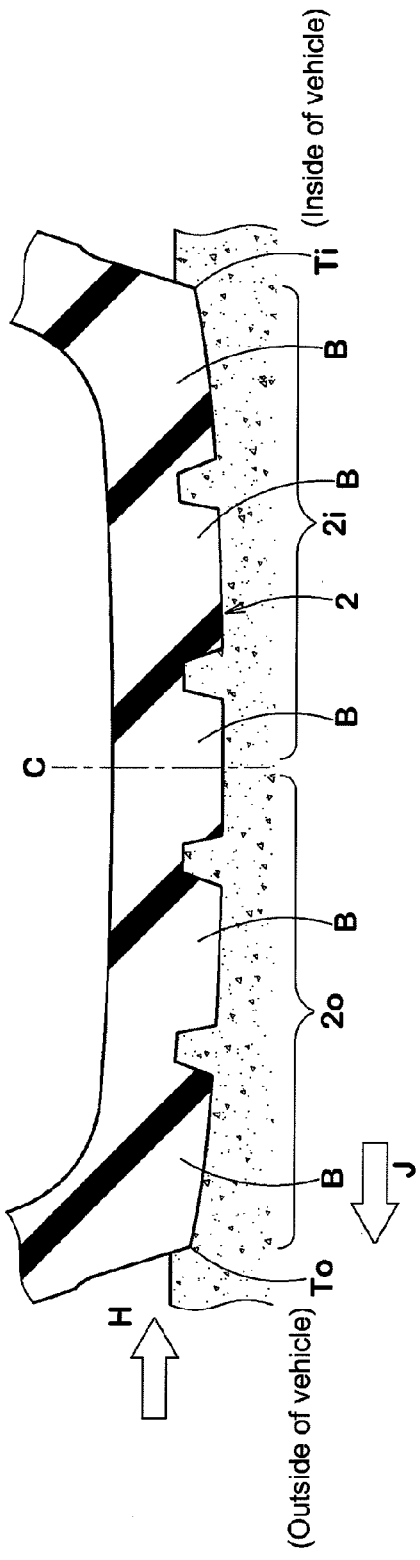
FIGS. 7(a) and 7(b) are cross sectional views of a tread portion for explaining its deformation caused during cornering.

By the way, during cornering on soft roads such as muddy roads and the like, tread blocks B of the tire positioned on the outside of turning, dig into the soft road surface as shown in FIG. 7(a), and the tread blocks B resist to side skid of the tire, and the outside tread edge To thereof receives the reaction force H in the opposite direction to the direction J of the side skid.

Figure 7B:
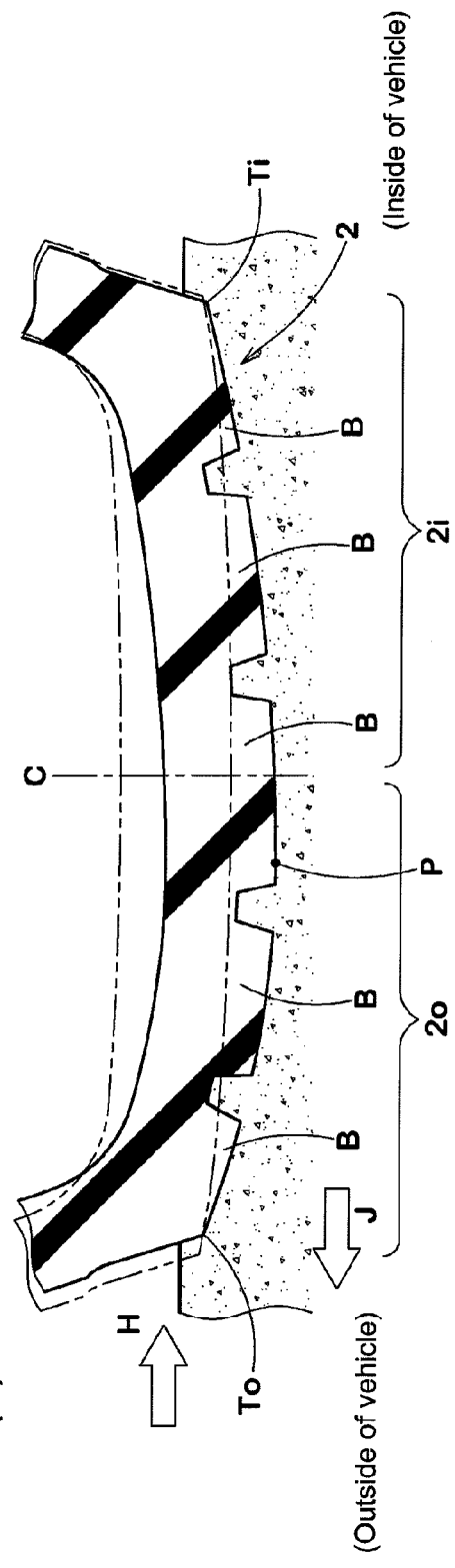

As a result, as shown in FIG. 7(b). The tread portion 2 in the ground contacting patch tends to be deformed radially outwardly. Therefore, in comparison with the oblique blocks B1 in the inside tread part 2i, the oblique blocks B1 disposed in the outside tread part 2o are increased in the ground pressure and thereby uneven wear is liable to occur in the outside tread part 2o.

Given that as shown in FIG. 2, the maximum axial width of the block is defined as the axial distance between the axially extreme ends of the block, it is preferable for preventing that kind of uneven wear that the maximum axial widths L6, L7, L8 and L9 of the oblique blocks B1 in every two oblique grooves 6 are arranged such that the larger the ground pressure, the larger the maximum axial width. More specifically, for the above reason, the ground pressure becomes larger in the block positioned more inside, therefore, the maximum axial width is set to be larger in the block positioned more inside.

Thus, the block rigidity in the tire axial direction becomes higher in the block positioned more inside.

As a result, wear of the oblique blocks B1 are evened, and uneven wear is reduced.

As shown in FIG. 7(b), the deformation of the tread portion 2 has a tendency that the amount of swelling becomes largest at a position P near and on the tread edge To side of the tire equator C.

Therefore, it is desirable to limit the maximum axial widths L7, L8 and L9 of the outside oblique blocks B1a such that the ratio (L9/L7) of the minimum of the maximum axial width (L9) to the maximum of the maximum axial width (L7) is in a range of not less than 0.5, more preferably not less than 0.6, and not more than 0.9, more preferably not more than 0.8.

Further, the ground contacting faces or top surfaces of the outside oblique blocks B1a may have different areas.

But, in order to even the ground pressure of the blocks, it is preferred that the ratio of the minimum area to the maximum area is not less than 0.90, more preferably not less than 0.95, still more preferably not less than 0.98.

Further, in order to even the ground pressure of the blocks, it is preferred that the ratio of the minimum volume to the maximum volume of the blocks is not less than 0.90, more preferably not less than 0.95, still more preferably not less than 0.98.

In this embodiment, as shown in FIG. 2, the blocks B between every two oblique grooves 6, include one L-shaped (or V-shaped) bent block B2. The bent block B2 is as shown in FIG. 4, defined by the two oblique grooves 6, the inside circumferential groove 3, one 1st axial groove 4, one 2nd axial groove 5, and one connecting groove 7, therefore, the bent block B2 comprises an axial part 11 extending from the inside circumferential groove 3 towards the tire equator C, and an oblique part 12 between the two oblique grooves 6.

The bent point E3 of the bent block B2 which is defined as the intersection point between the widthwise center line K5 of the axial part 11 with the widthwise center line K6 of the oblique part 12, is positioned on the inside tread edge Ti side of the tire equator C, and the axial distance L10 between the bent point E3 and the tire equator C is set in a range of from 0.10 to 0.25 times the tread width TW.

As the axial part 11 has a high rigidity in the axial direction, and the oblique part 12 has a high rigidity in the circumferential direction, the bent block B2 as a whole has high rigidity in both of the directions.

Further, as the bent point E3 is positioned at the specific position in the inside tread part 2i where the ground pressure is higher during straight running and cornering due to the negative camber, the above advantage of the axial part 11 and oblique part 12 can be most effected.

Specifically, as shown in FIG. 5, during straight running in which the ground pressure of the axial part 11 becomes relatively large, the traction/braking performance can be improved by the edges of the axial part 11 facing the 1st axial groove 4 and 2nd axial groove 5.

As shown in FIG. 6, during cornering, as the outside tread part in which the ground pressure of the oblique part 12 becomes relatively large, the lateral grip performance can be improved by the edges of the oblique part 12 facing the oblique grooves 6. If the bent point E3 is positioned on the tire equator C, the straight running stability, especially high speed straight running stability is deteriorated.

In order to derive the above advantages, the maximum axial width L11 of the bent block B2 is preferably set in a range of not less than 0.25 times, more preferably not less than 0.30 times, but not more than 0.45 times, more preferably not more than 0.40 times the tread width TW.

Further, the maximum axial width L11 is preferably not less than 1.5 times, more preferably not less than 1.8 times, but not more than 2.8 times, more preferably not more than 2.6 times the maximum circumferential length L12 of the bent block B2.

In this embodiment, as shown in FIG. 2, the blocks B further include trapezoidal blocks B3. The trapezoidal blocks B3 are each positioned between the circumferentially adjacent bent blocks B2 and each defined by the inside circumferential groove 3, one 1st axial groove 4, one 2nd axial groove 5, and one oblique groove 6.

The width of the trapezoidal block B3 gradually decreases towards the tire rotational direction R.

The edges of the trapezoidal block B3 facing the 1st axial groove 4 and 2nd axial groove 5 can improve the traction and breaking performance during straight running.

For that purpose, as shown in FIG. 4, the maximum axial width L13 of the trapezoidal block B3 is preferably not less than 0.10 times, more preferably not less than 0.15 times, but not more than 0.30 times, more preferably not more than 0.25 times the tread width TW.

Further, the maximum axial width L13 is preferably not less than 1.5 times, more preferably not less than 2.0 times, but not more than 3.5 times, more preferably not more than 3.0 times the maximum circumferential length L14 of the trapezoidal block B3.

In this embodiment, the blocks B further include circumferentially long blocks B4 defined by the inside circumferential groove 3, the inside tread edge Ti, and the inside axial grooves 8, and each having a maximum axial width L15 and a maximum circumferential length L16 more than the maximum axial width L15.

The circumferentially long blocks B4 can improve the traction/braking performance during straight running and the lateral grip performance during cornering.

As shown in FIG. 4, the maximum axial width L15 of the circumferentially long block B4 is preferably not less than 0.03 times, more preferably not less than 0.05 times, but not more than 0.15 times, more preferably not more than 0.10 times the tread width TW. Further, the maximum axial width L15 is preferably not less than 0.30 times, more preferably not less than 0.35 times, but not more than 0.45 times, more preferably not more than 0.40 times the maximum circumferential length L16 of the circumferentially long block B4.

Figure 8:
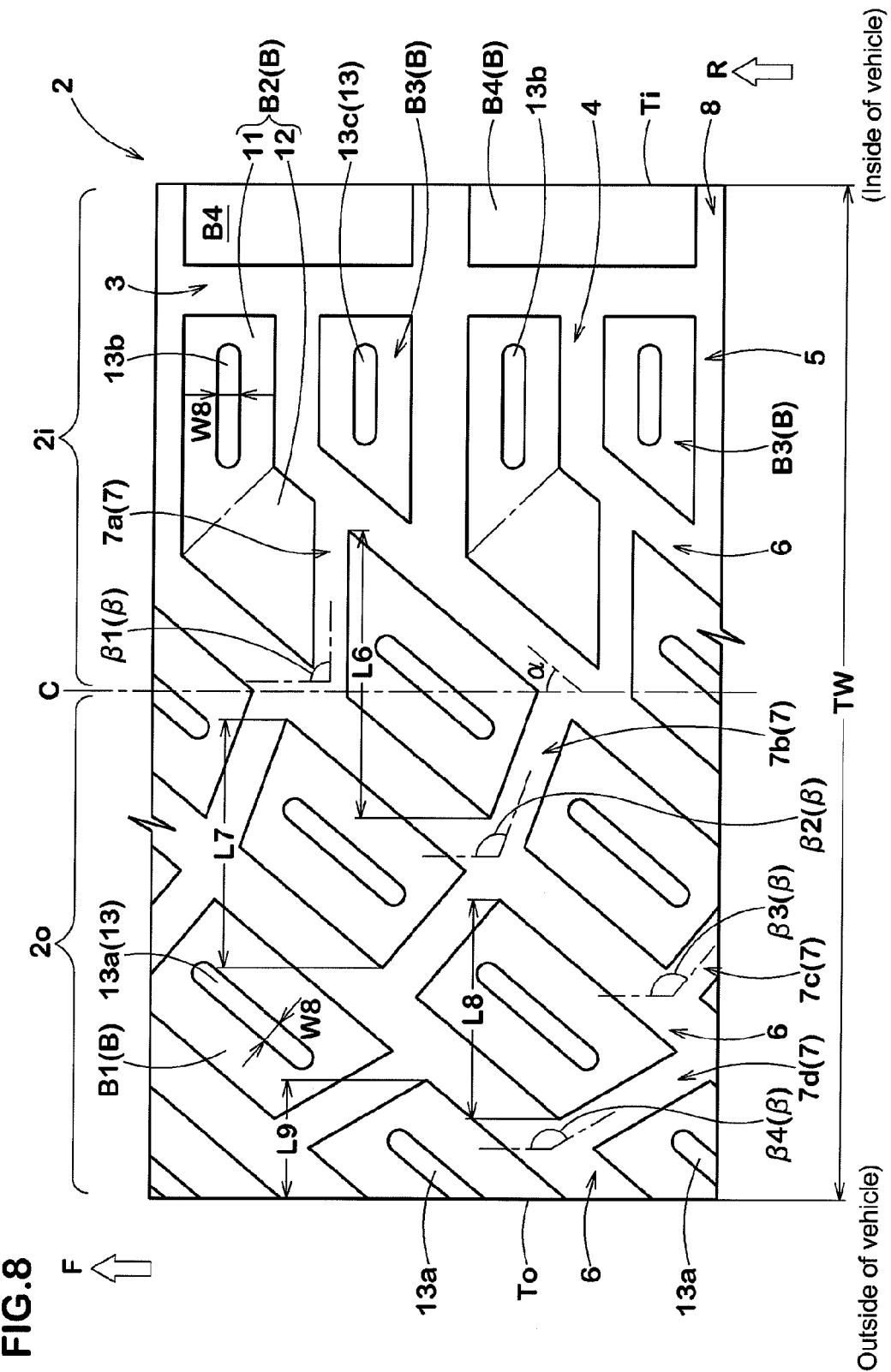
FIG. 8 is a developed partial top plan view of another embodiment of the present invention.

FIG. 8 shows a modification of the above described tread pattern. In this example, the blocks B are provided with shallow independent grooves 13 each terminating within the respective blocks.

The shallow grooves 13 include a first shallow groove 13a disposed in the oblique block B1, a second shallow groove 13b disposed in the axial part 11 of the bent block B2, and a third shallow groove 13c disposed in the trapezoidal block B3. The first shallow grooves 13a are parallel with the oblique grooves 6.

The first shallow grooves 13a can improve the lateral grip performance.

The second and third shallow grooves 13b and 13c are parallel with the 1st axial grooves 4 and 2nd axial grooves 5.

The second and third shallow grooves 13b and 13c can improve the traction/braking performance.

It is preferable that the shallow grooves 13a, 13b and 13c have a width W8 of from 1.0 to 5.0 mm, and a depth of from 1.0 to 3.0 mm.

Comparison Tests

Figure 9:
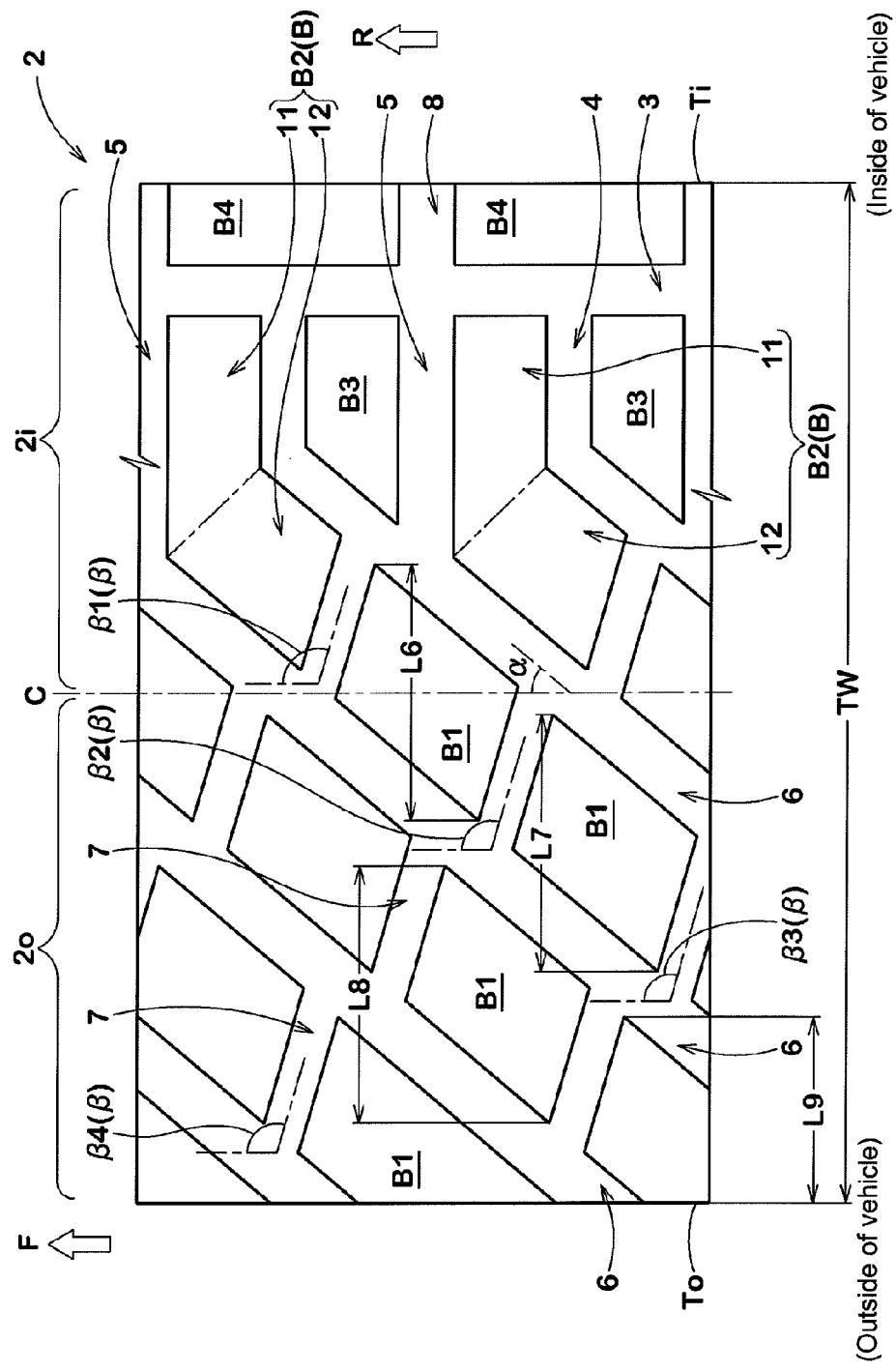
FIG. 9 is a developed partial top plan view of a comparative tire.
Figure 10:
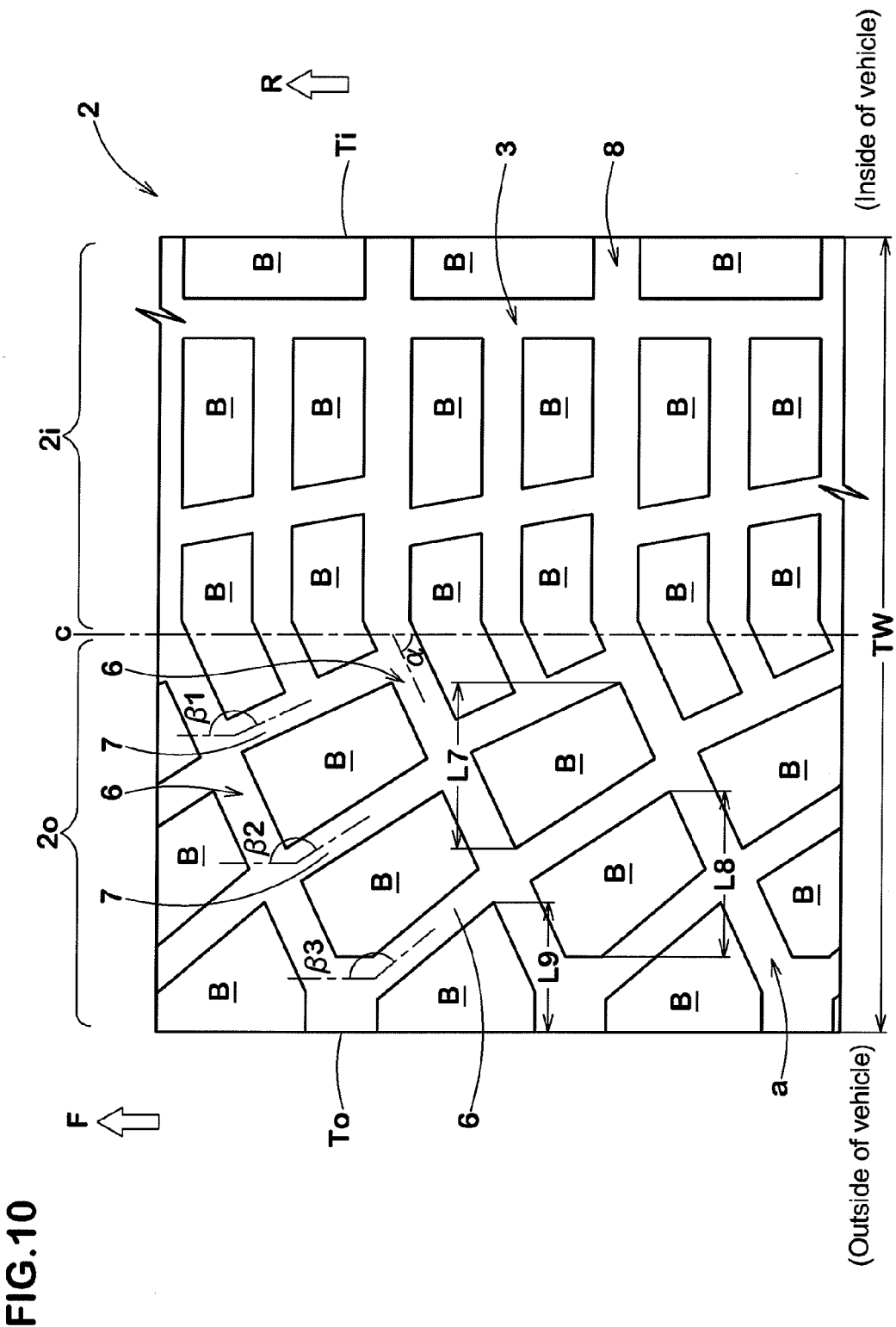
FIG. 10 is a developed partial top plan view of another comparative tire.

Pneumatic tires having tread patterns shown in FIGS. 2, 9 and 10 having specifications shown in Table 1 were made and tested.

Common specifications are as follows.
  tire size: 205/60R15
  wheel rim size: 7J×15
  tread width TW: 190 mm
  inside circumferential groove
    width W1: 9.0 mm
    depth: 11.5 mm
  1st axial groove
    width W2: 8.0 mm
    depth: 11.5 mm
  2nd axial grooves
    width w3: 10.0 mm
    depth: 11.5 mm
  oblique groove
    width W4: 10.0 mm
    depth: 11.5 mm
  connecting groove
    width W5: 7.3 mm
    depth: 11.5 mm
  inside axial groove
    width W6: 10.0 mm
    depth: 11.5 mm
  shallow grooves
    width W8: 3.0 mm
    depth: 2.0 mm
  axial width L6: 45.3 mm (1) Vehicle running test;
  2000 cc 4WD car (negative camber: 1.5 degrees) provided on the four wheels with the same test tires (tire pressure: 210 kPa) was run on an off-road test circuit course of 2.5 km and time trial was made twice.

At the same time, the test driver evaluated the following test items into five ranks. The larger the rank number, the better the performance. The results are shown in Table 1.
  traction/braking performance (soft road, hard road)
  straight running stability
  braking performance (soft road, hard road)
  braking stability
  initial stage responsiveness (initial stage of cornering)
  behavioral stability (initial stage of cornering)
  front wheel lateral grip performance (middle stage of cornering)
  rear wheel lateral grip performance (middle stage of cornering)
  steering response (middle stage of cornering)
  traction/braking performance (final stage of cornering) balance between front and rear (final stage of cornering)
  responsiveness (during high speed running) balance between front and rear (during high speed running)
  rigidity
  ground contact
  controllability
  reaction from road surface (2) Uneven wear resistance test:
  After running for 10 km on the above-mentioned test course, the heel and toe wear was measured on the outside oblique block on the most outside and the outside oblique block on the most inside and the mean value was obtained. The results are shown in Table 1 by an index based on comparative example 1 being 100, wherein the larger the index number, the better the uneven wear resistance.

From the test results, it was confirmed that the lateral grip performance can be greatly improved.

TABLE 1

| Tire | Ref.1 | Ref.2 | Ex.1 |
|---|---|---|---|
| tread pattern | FIG. 10 | FIG. 9 | FIG. 2 |
| angle α of oblique grooves (deg.) | 65 | 40 | 40 |
| number of connecting grooves | 3 | 3 | 4 |
| angle β1 (deg.) | 154 | 106 | 90 |
| angle β2 (deg.) | 147 | 106 | 110 |
| angle β3 (deg.) | 140 | 106 | 130 |
| angle β4 (deg.) | — | 106 | 150 |
| β1/β3 | 1.1 | — | — |
| β1/β4 | — | 1.0 | 0.6 |
| outside oblique block | | | |
| minimum area of top surface S1 (mm.sq) | 585 | 760 | 760 |
| maximum area of top surface S2 (mm.sq) | 785 | 770 | 770 |
| S1/S2 | 0.75 | 0.99 | 0.99 |
| outside oblique block | | | |
| width L7 (mm) | 37 | 45 | 37 |
| width L8 (mm) | 37 | 45 | 33 |
| width L9 (mm) | 29 | 33 | 29 |
| minimum width/maximum width | 0.78 | 0.73 | 0.78 |
| Test results | | | |
| Lap time | 1'53.99 | 1'53.93 | 1'53.27 |
| traction/braking performance (hard road) | 3.0 | 2.0 | 3.0 |

TABLE 1-continued

| Tire | Ref.1 | Ref.2 | Ex.1 |
|---|---|---|---|
| traction/braking performance (soft road) | 3.0 | 2.0 | 3.0 |
| straight running stability | 3.0 | 4.0 | 4.0 |
| braking performance (hard road) | 3.0 | 5.0 | 3.0 |
| braking performance (soft road) | 3.0 | 3.0 | 5.0 |
| braking stability | 3.0 | 3.0 | 3.0 |
| initial stage responsiveness (initial stage of cornering) | 3.0 | 2.0 | 3.0 |
| behavioral stability (initial stage of cornering) | 3.0 | 3.0 | 3.0 |
| front tire lateral grip performance (middle stage of cornering) | 3.0 | 2.0 | 4.0 |
| rear tire lateral grip performance (middle stage of cornering) | 3.0 | 1.5 | 4.0 |
| steering response (middle stage of cornering) | 3.0 | 3.0 | 4.0 |
| traction/braking performance (final stage of cornering) | 3.0 | 2.0 | 4.0 |
| balance between front and rear tires | 3.0 | 1.5 | 4.0 |
| responsiveness (high speed running) | 3.0 | 2.0 | 4.0 |
| balance between front and rear tires | 3.0 | 3.0 | 4.0 |
| rigidity | 3.0 | 4.0 | 5.0 |
| ground contact | 3.0 | 4.0 | 5.0 |
| controllability | 3.0 | 4.0 | 5.0 |
| reaction from road surface | 3.0 | 4.0 | 5.0 |
| wear resistance (index) | 100 | 110 | 110 |

The invention claimed is:

1. A pneumatic tire having a block-type tread pattern for which a tire mounting position with respect to a vehicle and a tire rotational direction are specified, comprising a tread portion having a pair of tread edges which are an outside tread edge and an inside tread edge, wherein the tread portion is provided with
a plurality of oblique grooves extending from the outside tread edge toward the inside tread edge beyond the tire equator, while inclining to one circumferential direction corresponding to the tire rotational direction at angles of from 20 to 45 degrees with respect to said one circumferential direction, and a plurality of connecting grooves extending between the oblique grooves at angles β of from 90 to 180 degrees with respect to said one circumferential direction, wherein between every two of the adjacent oblique grooves, disposed are three or more of the connecting grooves which are gradually decreased in the angle β from the outside tread edge towards the inside tread edge, whereby a plurality of oblique blocks are formed between every two of the adjacent oblique grooves, differences between adjacent angles β being not less than 15 degrees, and wherein the tread portion is further provided with
circumferentially long blocks disposed along the inside tread edge, each block having a maximum circumferential length and having a maximum axial width L15 not more than 0.45 times its maximum circumferential length.

2. The pneumatic tire according to claim 1, wherein in the angles β of said three or more of the connecting grooves, the ratio of the minimum angle to the maximum angle is not less than 0.5 and less than 1.0.

3. The pneumatic tire according to claim 1 or 2, wherein in the angles β of said three or more of the connecting grooves, the minimum angle is 90 degrees.

4. The pneumatic tire according to claim 1, wherein said three or more of the connecting grooves are four of the connecting grooves.

5. The pneumatic tire according to claim 1, wherein
said plurality of oblique blocks include a plurality of outside oblique blocks having top surfaces whose centroids are positioned on the outside tread edge side of the tire equator, and
the top surfaces of said plurality of outside oblique blocks have at least two different areas wherein the ratio of the minimum area to the maximum area is not less than 0.90.

6. The pneumatic tire according to claim 1, wherein said plurality of oblique blocks are gradually increased in the maximum axial width from the outside tread edge towards the inside tread edge 7. The pneumatic tire according to claim 6, wherein the ratio of the minimum to the maximum of the maximum axial widths is in a range of from 0.5 to 0.9.

* * * * *